United States Patent
Henksmeier et al.

(10) Patent No.: US 8,480,107 B2
(45) Date of Patent: Jul. 9, 2013

(54) WHEEL SUSPENSION FOR A MOTOR VEHICLE

(75) Inventors: Thomas Henksmeier, Wadersloh (DE); Erik Hochapfel, Gudensberg (DE); Waldemar Bera, Borchen (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 13/038,512

(22) Filed: Mar. 2, 2011

(65) Prior Publication Data

US 2012/0056396 A1 Mar. 8, 2012

(30) Foreign Application Priority Data

Apr. 13, 2010 (DE) .......................... 10 2010 014 847

(51) Int. Cl.
*B60G 3/12* (2006.01)
(52) U.S. Cl.
USPC .................................................. 280/124.128
(58) Field of Classification Search
USPC ......... 280/86.751–86.757, 124.128, 124.134, 280/124.135, 86.75
See application file for complete search history.

(56) References Cited

U.S. PATENT DOCUMENTS

| | | | | |
|---|---|---|---|---|
| 4,650,208 A * | 3/1987 | Mason | ...................... | 280/86.757 |
| 4,695,073 A * | 9/1987 | Pettibone et al. | ........ | 280/86.757 |
| 4,733,884 A * | 3/1988 | Pettibone et al. | ........ | 280/86.753 |
| 4,981,308 A * | 1/1991 | Kunert et al. | ............. | 280/86.754 |
| 5,080,388 A * | 1/1992 | Berry et al. | .............. | 280/86.757 |
| 5,082,306 A | 1/1992 | Khavkin | | |
| 5,301,977 A * | 4/1994 | Schlosser et al. | ........ | 280/86.757 |
| 5,931,485 A * | 8/1999 | Modinger et al. | ........ | 280/86.751 |
| 6,176,501 B1 * | 1/2001 | Bartolone | ................. | 280/86.756 |
| 6,557,872 B1 * | 5/2003 | Garrard | .................... | 280/86.751 |
| 6,676,142 B2 * | 1/2004 | Allman et al. | ........... | 280/86.751 |
| 2002/0190516 A1 | 12/2002 | Henksmeier et al. | | |

FOREIGN PATENT DOCUMENTS

| | | |
|---|---|---|
| DE | 455 094 | 1/1928 |
| DE | 37 14 689 A1 | 11/1988 |
| DE | 102005037973 | 2/2007 |

\* cited by examiner

*Primary Examiner* — Joseph Rocca
*Assistant Examiner* — Robert A Coker
(74) *Attorney, Agent, or Firm* — Henry M Feiereisen LLC

(57) ABSTRACT

A wheel suspension for a motor vehicle includes a suspension arm having a base body and support elements formed on the base body. Pivotally mounted on the suspension arm for rotation about a rotation axis is a wheel carrier which defines a wheel axis. An adjustment screw is arranged in substantial orthogonal relationship to the wheel axis and received at least one installation opening of the wheel carrier for securing the wheel carrier to the suspension arm.

10 Claims, 6 Drawing Sheets

WHEEL SUSPENSION FOR A MOTOR VEHICLE

CROSS-REFERENCES TO RELATED APPLICATIONS

This application claims the priority of German Patent Application, Serial No. 10 2010 014 847.4, filed Apr. 13, 2010, pursuant to 35 U.S.C. 119(a)-(d), the content of which is incorporated herein by reference in its entirety as if fully set forth herein.

BACKGROUND OF THE INVENTION

The present invention relates to a wheel suspension of a motor vehicle.

The following discussion of related art is provided to assist the reader in understanding the advantages of the invention, and is not to be construed as an admission that this related art is prior art to this invention.

Conventional suspension systems generally include attachment points to the vehicle body, bearings, at least one suspension arm, spring-and-shock absorber system, and a wheel carrier secured to the suspension arm. The suspension arm may be constructed as a transverse arm or semi-trailing arm. Semi-trailing arms typically find application in utility vehicles and are constructed as cast parts. These cast parts require cumbersome mechanical refinishing works to comply with the manufacturing tolerances of the predefined axle kinematics. In conventional semi-trailing arms, the toe of the axle or wheel is adjusted at the body attachment points. Wheel camber on the other hand cannot be readjusted. The camber specification is set during the design stage and depends on the wheel position, wheel rebound and wheel compression.

Manufacturing tolerances may lead however during initial installation of the wheel carrier to changes in the desired camber setting. Incorrect camber setting oftentimes causes tire wear on one side of the tire's tread and poor handling in the form of reduced cornering forces.

It would therefore be desirable and advantageous to provide an improved wheel suspension which obviates prior art shortcomings and which is easy to produce while maintaining dimensional precision.

SUMMARY OF THE INVENTION

According to one aspect of the present invention, a wheel suspension for a motor vehicle includes a suspension arm, a wheel carrier defining a wheel axis and pivotally mounted on the suspension arm for rotation about a rotation axis, with the wheel carrier constructed to include at least one installation opening, and an adjustment screw arranged in substantial orthogonal relationship to the wheel axis and received in the at least one installation opening for securing the wheel carrier to the suspension arm.

A wheel suspension according to the present invention allows individual adjustment of the camber of the vehicle wheel. While the camber specification is determined during the design stage, the present invention renders possible a readjustment of the camber during initial installation of the wheel suspension or at any suitable time later, for example during maintenance works or after an accident.

According to another advantageous feature of the present invention, the suspension arm may be constructed as a semi-trailing arm or also as a twist beam. Also possible is the provision of a wheel suspension according to the present invention for a rigid axle in order to adjust camber. In the description, the term "suspension arm" may thus relate to a semi-trailing arm, twist beam, transverse control arm, push-rod, pull rod, rigid axle, or any combination of the aforementioned axle types. Currently preferred is however a configuration of the suspension arm as semi-trailing arm. A wheel suspension according to the present invention can find application in any type of motor vehicle, including utility vehicles. The wheel carrier can hereby be mounted to a rotation axis of a semi-trailing arm for example, with the wheel carrier being pivotally mounted about the rotation axis. The rotation axis may be situated above or below the semi-trailing arm with respect to the vehicle coordinate system. A further fastening device is constituted by the adjustment screw which can engage through installation openings of, for example, a clevis of the semi-trailing arm and fixes the position after camber adjustment. The wheel carrier is thus fixed in place in relation to the suspension arm.

According to another advantageous feature of the present invention, the installation opening may be configured in the form of an oblong hole. The oblong hole points hereby in Y direction with respect to the vehicle coordinate system. This has the benefit that camber adjustment may be realized through pivoting the wheel carrier about the rotation axis which points in substantial parallel relationship to the x axis of the vehicle. The adjustment screw passes through the oblong holes to define the upper and lower limits at the end stops of the oblong hole, respectively, for adjustment options of the wheel camber. The wheel camber can thus be adjusted over the whole space of the oblong hole.

According to another advantageous feature of the present invention, the suspension arm may be constructed in the form of a hybrid structure comprised of several individual components. The suspension arm may for example include at least two individual components. Examples include pressed shells, tubes, sleeves, flanges, and/or reinforcements. The components of the suspension arms are suitably coupled to one another, e.g. by material joint, interference fit and/or formfit. Examples of suitable materials include steel, iron, aluminum, magnesium, alloys thereof, GFRP (glass fiber reinforced plastic) or CFRP (carbon fiber reinforced plastic). The components may be forged, cast, used as semi-finished products, or made by any other suitable process. The suspension arm, e.g. semi-trailing arm, thus produced has many benefits, including cost-efficient production or little specific own weight. Especially as a result of its lightweight construction, a suspension arm according to the present invention distinguishes itself from currently available cast semi-trailing arms. Weight is a concern in the automobile industry so that the presence of a particularly lightweight suspension arm according to the invention, such as a semi-trailing arm, is desired especially since the semi-trailing arm is part of the overall unsprung wheel mass.

According to another advantageous feature of the present invention, a support structure can be provided on a base body of the suspension arm for receiving the adjustment screw. In the event of a solid suspension arm, the support structure may for example be constructed as a support element formed with a guide bore for receiving the adjustment screw. In the event of a built semi-trailing arm, the support structure may be constructed as solid part which is coupled with the suspension arm for receiving the adjustment screw. Coupling may be realized by material joint, interference fit and/or formfit. The support structure may be constructed in the form of a sheet metal part, forged part and/or welded part. The support structure may also be made from a composite. Manufacturing a particular support element and/or coupling of a separate support structure with the suspension arm has the benefit of permitting a pre-adjustment of the wheel camber already in the production process. Further adjustments of the wheel camber can then be implemented with the adjustment screw.

According to another advantageous feature of the present invention, the adjustment screw can connect the wheel carrier and the support structure through force-fitting engagement for adjusting the wheel camber. After the wheel camber has been set through pivoting the wheel carrier about the rotation axis of the suspension arm, the attained camber setting can be fixed via the adjustment screw. This can be realized by interference fit, tightening the adjustment screw and jamming the clevis with the support structure. A thus-attained connection for fixing the camber setting can easily be implemented mechanically and is less susceptible to defects as well as easily loosenable again for readjusting the camber setting if this were to become necessary.

According to another advantageous feature of the present invention, the adjustment screw can be constructed in the form of an eccentric screw. The eccentric screw may be defined by an outer diameter which is eccentric to the rotation axis of the screw. A turning of the eccentric screw results in a guidance of the installation openings and thereby an adjustment of the wheel camber. After desired adjustment, the eccentric screw is tightened to establish a force-fitting connection between wheel carrier, support structure and eccentric screw.

The provision of an eccentric screw enables an installer to fine-tune and/or re-adjust the wheel camber in a particularly simple manner because of the ability to precisely set the desired wheel camber by turning the adjustment screw and then securing the adjustment screw in place.

According to another advantageous feature of the present invention, support plates can be connected to the base body of the suspension arm for receiving the wheel carrier. The connection may be realized by material joint. The support plates support the wheel carrier in a way as to establish the rotation axis between the support plates and the wheel carrier. The support plates may be constructed as sheet metal part, milled part, cast part or by way of any other suitable production process.

The support plates may be made from steel or a composite material. Pins, e.g. threaded screws with support elements on the screw can be used. For receiving the pins, the support plates have openings which may be configured in the form of oblong holes. This allows fine adjustment of the camber also in the area of the rotation axis. Coupling may also be realized with socket pins or the like. The support plates provide the added benefit that the support region can be configured with optimum stress profile and/or force pattern while being lightweight. The support plates can be arranged on the suspension arm such as to extend in a geometry within the manufacturing tolerance. Thus, the need for re-adjustment of the support plates or positioning of the rotation axis is eliminated.

According to another advantageous feature of the present invention, the base body of the suspension arm can be constructed in the form of a sheet metal part. As a result, the suspension arm can be made cost-efficiently and effectively. Attachment of tubes, bearing pins, support plates, support structure and similar components can be implemented in an especially simple manner while attaining a high-strength connection, e.g. through a material joint. Furthermore, the base body as sheet metal part can be hot formed and press hardened. Thus, the base body has great strength and is lightweight and provides an optimum between manufacturing accuracy, strength, and cost-efficient production.

According to another advantageous feature of the present invention, a spring receptacle can be connected to the base body of the suspension arm and to one of the support plates. In this way, the vehicle body can be supported on the suspension arm via a spring in the spring receptacle. Coupling the spring receptacle to the support plate thus provides an optimum force pattern and/or stress profile for transmitting static and dynamic wheel forces.

According to another advantageous feature of the present invention, the suspension arm can have a base body and support elements formed on the base body, with the support elements constructed at least in part in the form of tubular structures with bearing flanges. In this way, the support elements can be best suited to the kinematic coupling demands on the base body by the bearing flanges which are connected with the base body via tubular structures. This realizes a broad range of possible geometric shapes of a suspension arm according to the invention.

According to another aspect of the present invention, a wheel suspension for a motor vehicle includes a suspension arm, a wheel carrier pivotally mounted on the suspension arm for rotation about a rotation axis, and an active adjustment element arranged between the wheel carrier and the suspension arm for pivoting the wheel carrier about the rotation axis.

A wheel suspension with active adjustment element allows active camber adjustment during operation of the motor vehicle or when the motor vehicle is at a standstill. Using sensors to continuously or periodically monitor the wheel camber and to transmit data to a controller allows a change of the wheel camber via the active adjustment element. It is also conceivable to match the camber adjustment, for example when a utility vehicle is involved, to the loading condition of the utility vehicle.

It is further conceivable to adjust the camber by the active adjustment element during travel. For example, when steering the vehicle through a turn, the wheel camber can be adjusted to provide a greater cornering force, if needed. In this context, it is also possible to use, for example, data from an electronic stability program control unit. When oversteering a vehicle, change of camber provides an increased cornering force, allowing a safer handling of the vehicle. The active camber adjustment may also occur in cooperation with braking commands of a stability program.

According to another advantageous feature of the present invention, the active adjustment element may be a longitudinally operating actuator which includes, for example, an electromechanical spindle drive, a hydraulic, pneumatic and/or magnetic actuator. Other types of active adjustment elements are, of course, also conceivable within the scope of the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
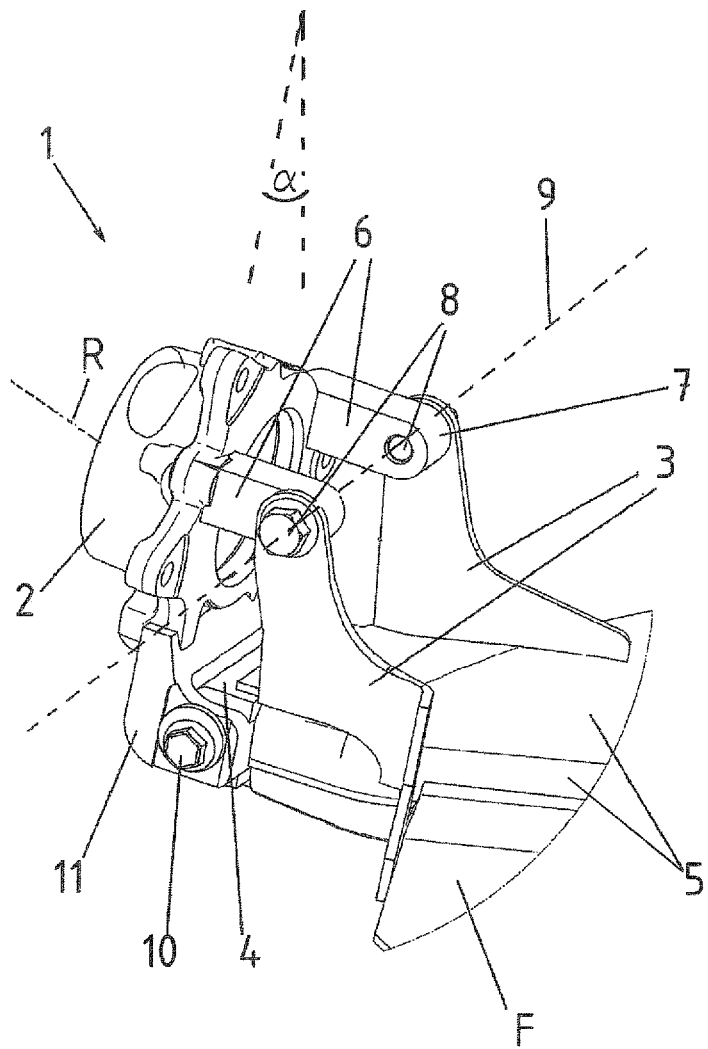
FIG. 1 is a perspective illustration of one embodiment of a vehicle wheel suspension according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of a wheel suspension according to the present invention, generally designated by reference numeral 1, for an unillustrated motor vehicle. The wheel suspension 1 includes a wheel carrier 2 which is connected to a suspension arm 5 by support plates 3 and a support structure 4. By way of example, the suspension arm 5 is constructed in the form of a hybrid structure comprised of several individual components. The wheel carrier 2 has two elongated arms 6 having ends 7 which are coupled to the support plates 3 by bolts 8, respectively. The support plates 3 are generally of L-shaped configuration and connected to the suspension arm 5 by a material joint. Formed on ends of the support plates 3 are openings 21 (FIG. 2) for receiving the bolts 8. The wheel carrier 2 is pivotally mounted in relation to the suspension arm 5 for rotation about a rotation axis 9 which is defined by the bolts 8. The pivotal movement defines an adjustment range for an angle α which corresponds to a camber adjustment of the wheel.

Figure 2:
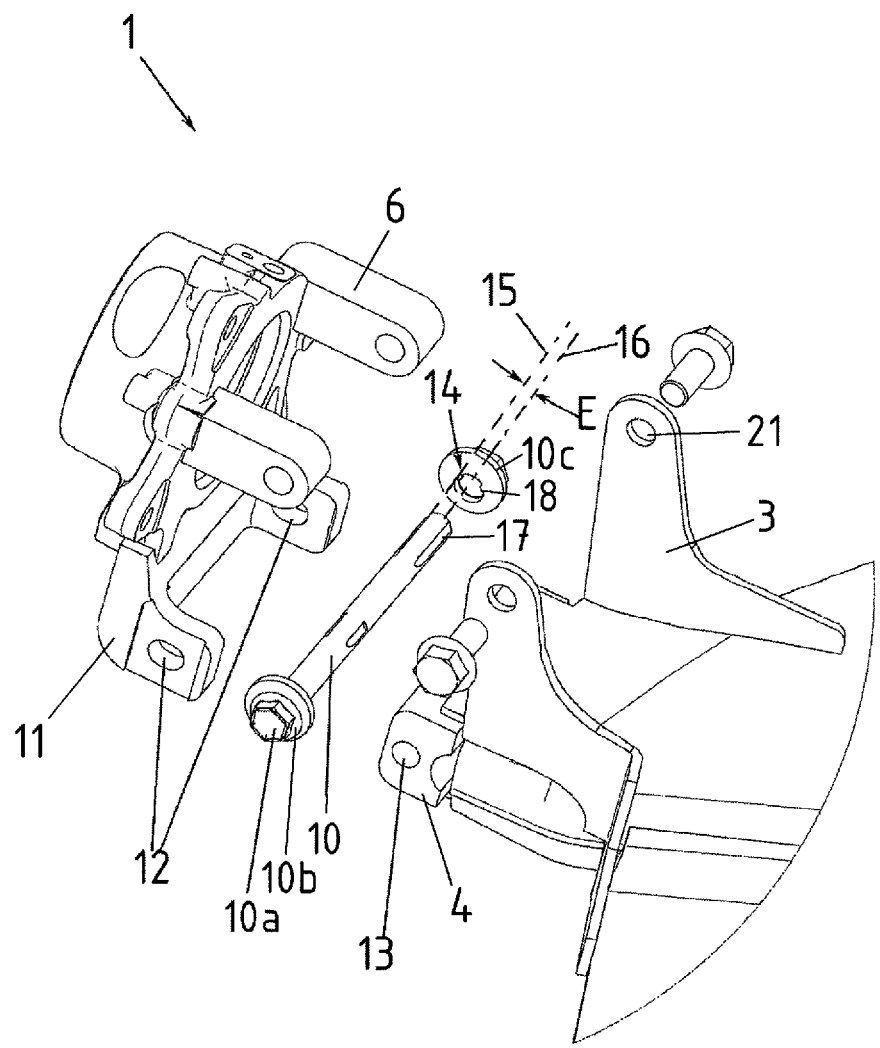
FIG. 2 is an exploded view of the vehicle wheel suspension of FIG. 1.

The wheel carrier 2 is further coupled to the suspension arm 5 via an adjustment screw 10 and the support structure 4. The wheel carrier 2 is hereby provided with a clevis 11 having installation openings 12 (FIG. 2). The adjustment screw 10 is inserted through the installation openings 12 and the support structure 4 to secure the wheel carrier 2 to the suspension arm 5 through interference fit. The adjustment screw 10 extends in substantial orthogonal relationship to a wheel axis R.

As is indicated in FIG. 1, one of the support plates 3 is coupled with a spring receptacle F for receiving a not shown spring. The spring receptacle F is also coupled to the suspension arm 5.

FIG. 2 shows an exploded view of the vehicle wheel suspension 1. As can be seen in FIG. 2, the installation openings 12 are configured in the form of an oblong hole. The support structure 4 has a mounting hole 13 which can be brought into alignment with the installation openings 12. The adjustment screw 10 which is configured in the form of an eccentric screw is thus able to extend through the clevis 11 and support structure 4. The adjustment screw 10 includes a screw head 10a and a washer 10b. Both the screw head 10a and the washer 10b have inwardly directed spherically-shaped surfaces 14, respectively, which define a center axis 15 in eccentric relationship to a center axis 16 of the adjustment screw 10. Turning the adjustment screw 10 causes also a rotation of the spherically-shaped surfaces 14 of the screw head 10a and the washer 10b in offset relationship to the adjustment screw 10 so that the installation openings 12 of the wheel carrier 2 move to a certain position, i.e. the wheel carrier 2 can be repositioned in relation to the support structure 4. As a result, the angle α of the camber can be adjusted. When the wheel carrier 2 has the desired camber setting, the adjustment screw 10 is secured in place with a lock nut 10c formed with lugs 18 for engagement in grooves 17 of the adjustment screw 10.

Figure 3:
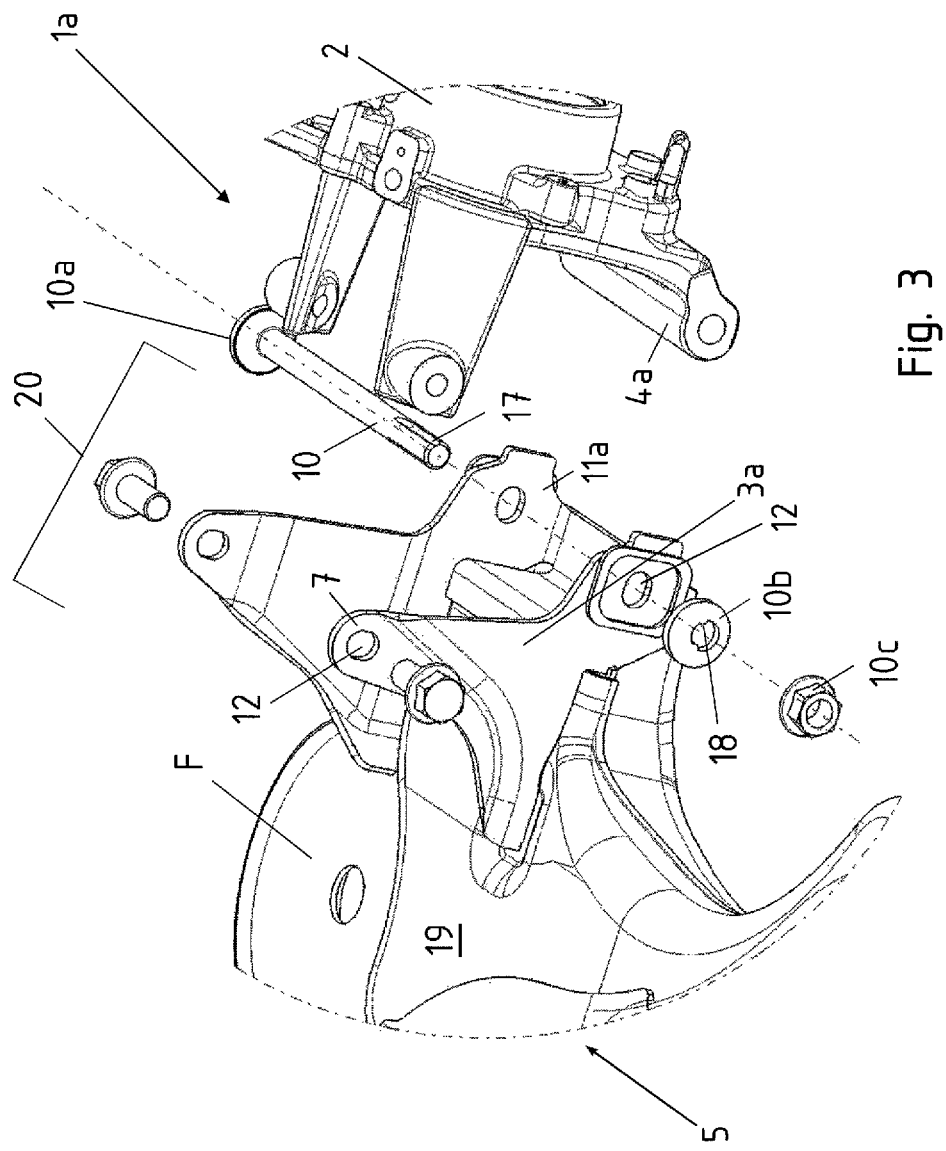
FIG. 3 is an exploded view of another embodiment of a vehicle wheel suspension according to the present invention.

Referring now to FIG. 3, there is shown an exploded view of another embodiment of a vehicle wheel suspension according to the present invention, generally designated by reference numeral 1a. Parts corresponding with those in FIG. 1 will be identified, where appropriate for the understanding of the invention, by corresponding reference numerals followed by an "a". The description below will center on the differences between the embodiments. In this embodiment, the wheel suspension 1a has support plates 3a which have integrated therein a clevis 11a which is thus formed on the suspension arm 5. This configuration provides a particular beneficial force flux of the cornering forces via the wheel carrier 2 into the suspension arm 5. In this embodiment, as viewed in the drawing plane, the wheel carrier 2 has an underside which is provided with a support structure 4a.

As further shown in FIG. 3, the adjustment screw 10 has grooves 17 for engagement of lugs 18 formed on the washer 10b. Thus, as the adjustment screw 10 is turned, the interlocking form-fitting engagement between grooves 17 and lugs 18 causes also the washer 10b to turn so that the lock nut 10c is turned as well to secure the angle α of the camber in a force-fitting manner by tightening the adjustment screw 10.

Figure 3A:
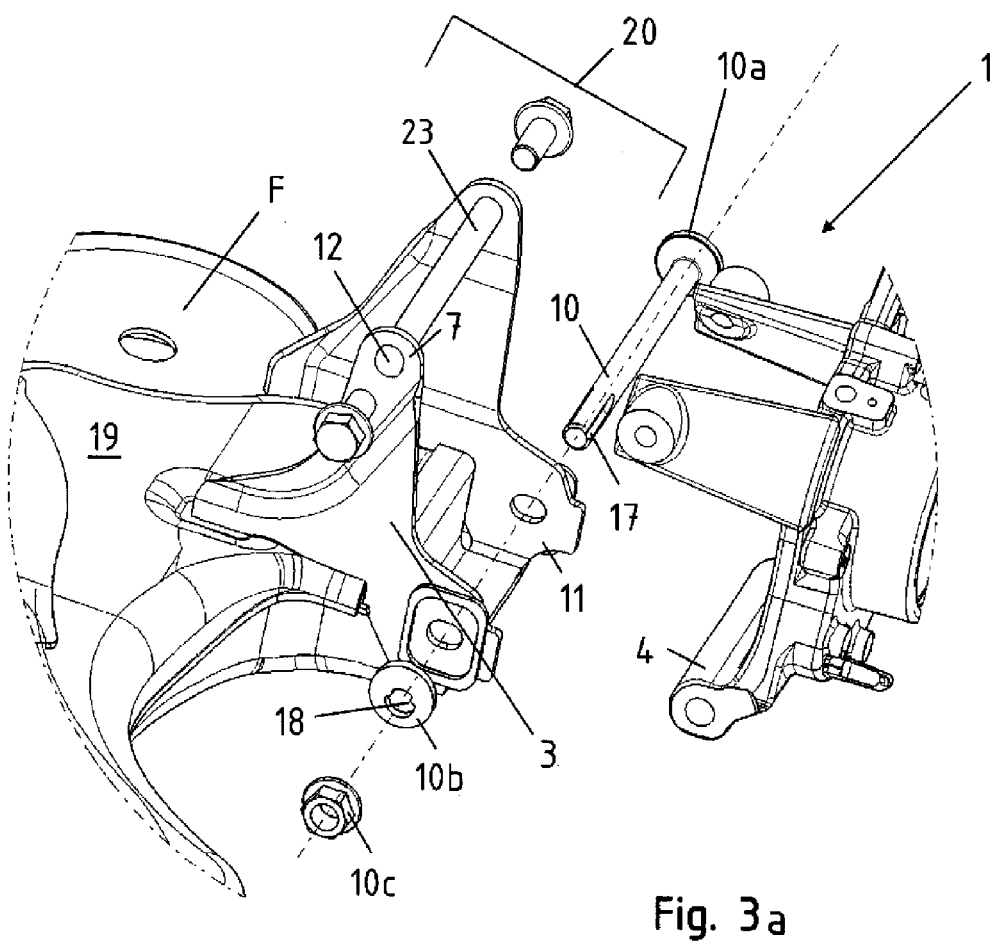
FIG. 3a is an exploded view similar to FIG. 3 with illustration of a tubular structure as part of a support element.

The installation openings 12 at the ends 7 of the support plates 3a are configured as oblong holes. The suspension arm 5 has a base body 19 with attached support elements 20 and includes the spring receptacle F. The support elements 20 can be constructed at least in part in the form of a tubular structure 23 with bearing flanges, as shown by way of example in FIG. 3a.

Figure 4:
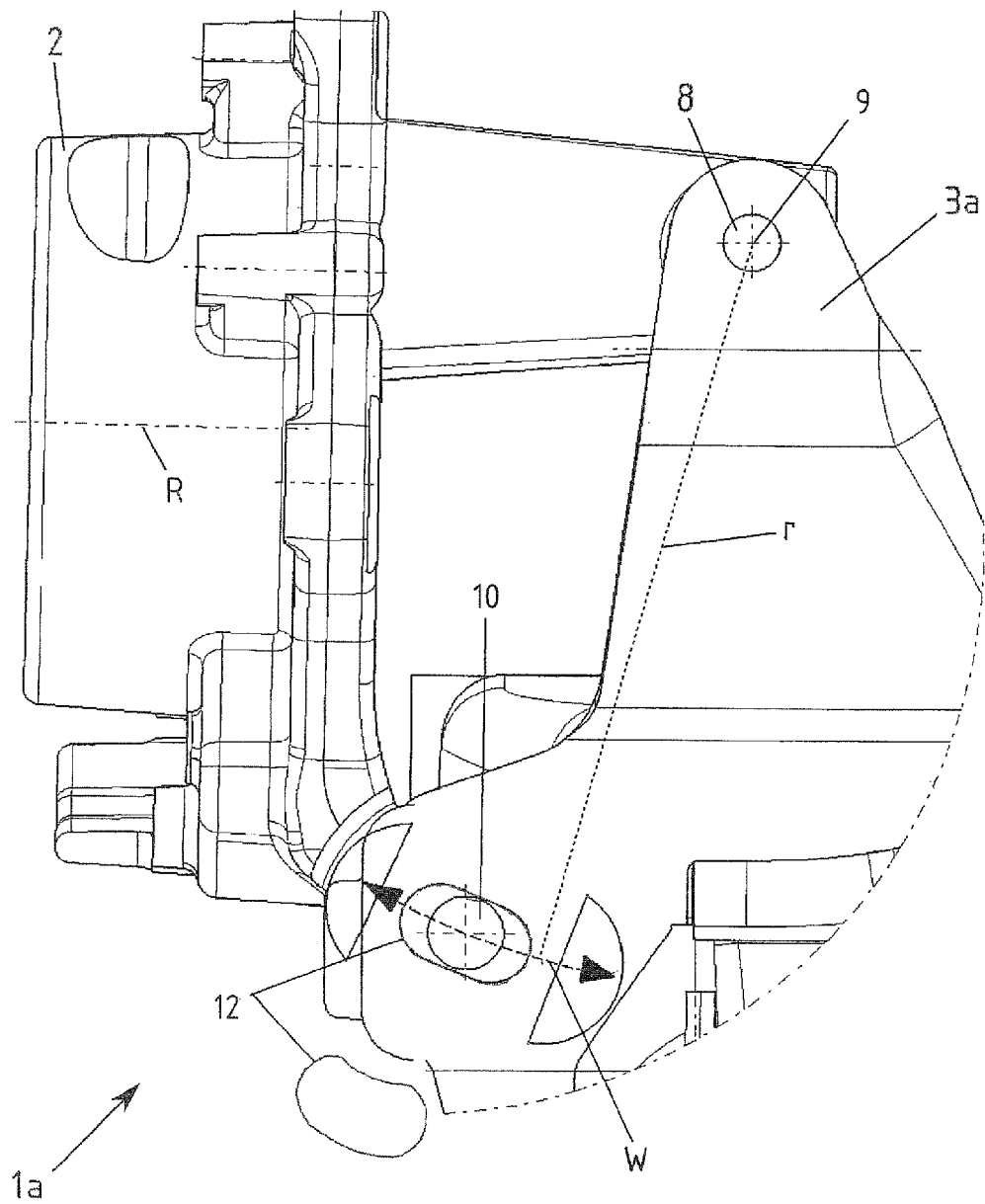
FIG. 4 is a detailed side view of a vehicle wheel suspension of FIG. 3.

FIG. 4 is a detailed side view of the vehicle wheel suspension 1a, illustrating the configuration of the installation opening 12 in the form of the oblong hole which is tangential to an effective circle W about the rotation axis 9. The configuration of the oblong hole may also be suited to the radius r of the effective circle W so that the oblong hole receives a slight curvature, as indicated in FIG. 4.

Figure 5:
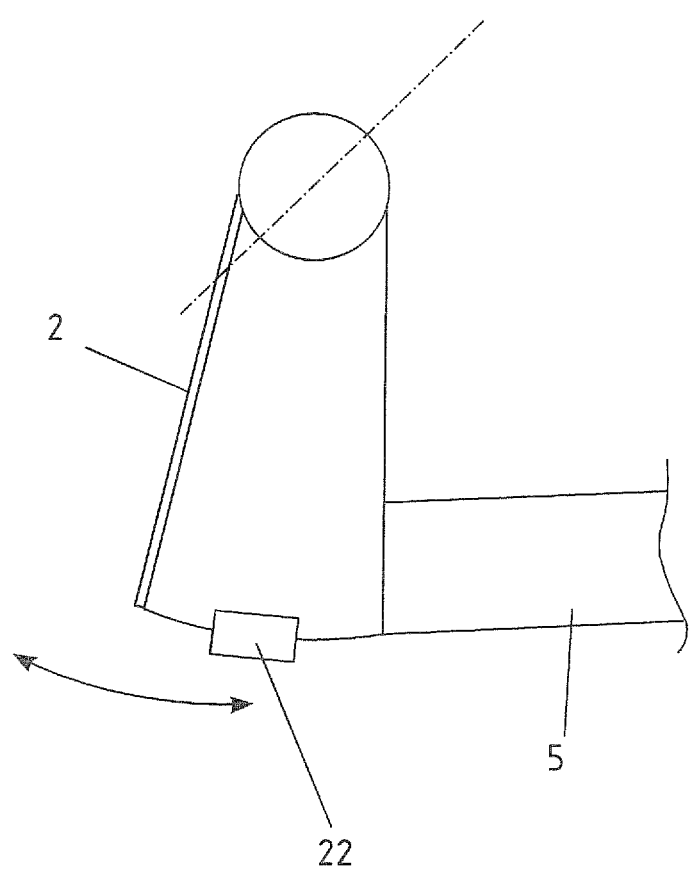
FIG. 5 is a schematic illustration of a wheel carrier with active adjustment element.

FIG. 5 is a schematic illustration of the wheel carrier 2 which is pivotally mounted on the suspension arm 5 for rotation about the rotation axis 9. An active adjustment element 22 is hereby arranged between the wheel carrier 2 and the suspension arm 5 for pivoting the wheel carrier 2 about the rotation axis 9.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A wheel suspension, comprising:
   a suspension arm including a base body and support elements formed on the base body, said support elements being constructed at least in part in the form of tubular structures with bearing flanges;
   a wheel carrier defining a wheel axis;

a pivot connection for pivotally mounting the wheel carrier to the suspension arm; and an adjustment screw received in an oblong hole of the pivot connection in substantial orthogonal relationship to the wheel axis and constructed to allow adjustment of the wheel carrier in relation to the suspension arm by rotating the adjustment screw to thereby set an angle of camber.

2. The wheel suspension of claim 1, wherein the adjustment screw is an eccentric screw defined by an outer diameter which is eccentric to a rotation axis of the adjustment screw.

3. The wheel suspension of claim 1, wherein the suspension arm is a semi-trailing arm.

4. The wheel suspension of claim 1, wherein the suspension arm is constructed in the form of a hybrid structure comprised of several individual components.

5. The wheel suspension of claim 1, further comprising a support structure provided on a base body of the suspension arm for receiving the adjustment screw.

6. The wheel suspension of claim 5, wherein the adjustment screw connects the wheel carrier and the support structure through force-fitting engagement for fixing a camber adjustment.

7. The wheel suspension of claim 1, further comprising support plates connected to a base body of the suspension arm for receiving the wheel carrier.

8. The wheel suspension of claim 7, wherein the support plates are connected to the base body of the suspension arm by a material joint.

9. The wheel suspension of claim 7, further comprising a spring receptacle connected to the base body of the suspension arm and to one of the support plates.

10. The wheel suspension of claim 1, wherein the base body of the suspension arm is constructed in the form of a sheet metal part.

* * * * *